United States Patent
Zhou et al.

(10) Patent No.: US 10,773,243 B2
(45) Date of Patent: Sep. 15, 2020

(54) THERMOLATENT CATALYST AND ITS USE IN CURABLE COMPOSITIONS

(71) Applicant: PPG INDUSTRIES OHIO, INC., Cleveland, OH (US)

(72) Inventors: Hongying Zhou, Allison Park, PA (US); Scott J. Moravek, Mars, PA (US); Davina J. Schwartzmiller, Rural Valley, PA (US); Jun Deng, Mars, PA (US); Jonathan Thomas Martz, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 212 days.

(21) Appl. No.: 15/698,037

(22) Filed: Sep. 7, 2017

(65) Prior Publication Data

US 2019/0070589 A1 Mar. 7, 2019

(51) Int. Cl.

| | |
|---|---|
| *B01J 23/14* | (2006.01) |
| *B01J 31/18* | (2006.01) |
| *C08G 18/02* | (2006.01) |
| *C08G 18/62* | (2006.01) |
| *C08G 18/24* | (2006.01) |
| *C08G 18/79* | (2006.01) |
| *B01J 31/22* | (2006.01) |

(52) U.S. Cl.
CPC .......... *B01J 23/14* (2013.01); *B01J 31/1805* (2013.01); *C08G 18/02* (2013.01); *C08G 18/24* (2013.01); *C08G 18/6216* (2013.01); *C08G 18/792* (2013.01); *B01J 31/223* (2013.01); *B01J 2531/42* (2013.01); *B01J 2540/10* (2013.01); *B01J 2540/40* (2013.01)

(58) Field of Classification Search
None
See application file for complete search history.

(56) References Cited

U.S. PATENT DOCUMENTS

| | | |
|---|---|---|
| 8,618,213 B2 | 12/2013 | Flosbach et al. |
| 8,946,372 B2 | 2/2015 | Richter et al. |
| 2011/0054140 A1 | 3/2011 | Krause et al. |
| 2011/0245375 A1 | 10/2011 | Nesvadba et al. |
| 2012/0220717 A1 | 8/2012 | Richter et al. |

FOREIGN PATENT DOCUMENTS

EP 2772496 A1 9/2014

OTHER PUBLICATIONS

Jing et al. Inorg. Chem., 43, 4315-4327 (Year: 2004).*

* cited by examiner

*Primary Examiner* — Yun Qian
(74) *Attorney, Agent, or Firm* — Krisanne Shideler

(57) ABSTRACT

Tin-containing catalysts are provided comprising a compound of formula I.
I:

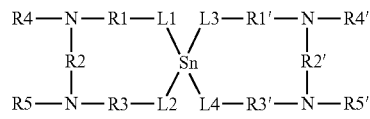

L1, L2, L3, and L4 are each independently selected from —O—, —S—, —OC(=O)—, —OC(=S)—, —SC(=O)—, —SC(=S)—, —OS(=O)$_2$O—, —OS(=O)$_2$—, —N(R6)-, and —OP(=O)(R6)-, wherein R6 represents hydrogen or a monovalent aliphatic, araliphatic, cycloaliphatic or aromatic group having up to 20 carbon atoms. R1, R2, R3, R1', R2', and R3' each independently represent a divalent aliphatic, araliphatic, cycloaliphatic or aromatic group having up to 20 carbon atoms; and R4, R5, R4', and R5' each independently represent hydrogen or a monovalent residue derived from reaction of a respective N—H group with an isocyanate, an ethylenically unsaturated compound, a lactone, a dilactone, a thiolactone, a lactam, a thiolactam, a carboxylic acid or derivative thereof, or an epoxide. Also provided are curable compositions containing these catalysts and methods of controlling the rate of cure of curable compositions.

16 Claims, No Drawings

THERMOLATENT CATALYST AND ITS USE IN CURABLE COMPOSITIONS

FIELD OF THE INVENTION

The present invention is directed to thermolatent tin-containing catalysts and their use in curable compositions to control the rate of cure.

BACKGROUND OF THE INVENTION

Catalysis is an initiation or a change in the rate of a chemical reaction due to the participation of a material called a catalyst. Catalysts that speed the reaction are called positive catalysts. Catalysts that slow the reaction are called negative catalysts, or inhibitors. Unlike reactants, a catalyst is not consumed by the reaction itself.

A catalyst works by providing an alternative reaction pathway to the reaction product. The rate of the reaction is increased when this alternative route has a lower activation energy than the reaction route not mediated by the catalyst. Catalysts can also enable reactions that would otherwise be blocked or slowed by a kinetic barrier. The catalyst may increase reaction rate and/or selectivity, or enable the reaction to proceed at lower temperatures than would otherwise be possible. As such, catalysts can be very valuable tools in industrial processes. There can be drawbacks to the use of catalysts though. For example, tin compounds are used extensively in industrial products such as coatings, as catalysts for isocyanate/hydroxyl reactions. Unfortunately, often the catalyst levels required to provide acceptably fast cure rates and final product properties typically result in a short application time window after the components are mixed.

There is a need to work in a timely manner so that the mixed components maintain a low enough viscosity for spraying. The span of time during which the coating is ready to apply to a substrate and still of low enough viscosity to be applied is commonly referred to as "pot life."

In the normal paradigm of catalyzed compositions, pot life and cure speed are typically in opposition to one another such that faster cure is facilitated by a higher catalyst concentration but at the expense of shorter pot life and vice versa. Longer pot life can be achieved with a lower catalyst concentration but will also lead to longer cure times. Typically, pot life must be balanced with cure speed of the applied coating. For instance, in a multi-component coating system that uses a catalyst, the pot life and cure speed are primarily controlled by the amount of catalyst present. Accordingly, if a fast cure speed is required more catalyst can be used but that will also cause a shorter pot life. Conversely, if a longer pot life is needed less catalyst can be used but the cure speed would also be retarded.

It is also important that the applied coating composition dry and harden quickly so that dirt pick-up is minimized and valuable shop space isn't occupied with the coated substrate, such as an automobile, while it is drying. The length of time between when a coating is applied to a substrate and when the coating has dried or cured sufficiently that dust falling onto the coated substrate will not stick to the coated substrate is referred to as "dust-free time" and is an indicator of the speed of cure. One way to speed the drying and cure of the composition is to add additional catalyst, but this shortens the time available for spraying since higher catalyst levels also cause viscosity of the composition to increase more quickly as reaction rates increase.

It would be desirable to catalyze chemical reactions using catalysts that overcome these drawbacks of the prior art by lengthening the pot life of the composition or by accelerating the reaction rate after application without adversely affecting the pot life.

SUMMARY OF THE INVENTION

It has unexpectedly been found by the inventors that the drawbacks of the prior art can be overcome by novel tin-containing compounds of formula I:

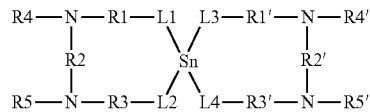

wherein
L1, L2, L3, and L4 are each independently selected from —O—, —S—, —OC(=O)—, —OC(=S)—, —SC(=O)—, —SC(=S)—, —OS(=O)$_2$O—, —OS(=O)$_2$—N(R6)-, and —OP(=O)(R6)- wherein R6 represents hydrogen or a monovalent aliphatic, araliphatic, cycloaliphatic or aromatic group having up to 20 carbon atoms, which can optionally contain one or more heteroatom selected from the group consisting of oxygen, sulfur and nitrogen;
R1, R2, R3, R1', R2', and R3' each independently represent a divalent aliphatic, cycloaliphatic, aromatic or araliphatic group having up to 20 carbon atoms, which can optionally contain one or more heteroatoms selected from the group consisting of oxygen, sulfur, and nitrogen; and
R4, R5, R4', and R5' each independently represent hydrogen or a monovalent residue derived from reaction of a respective N—H group with an isocyanate, an ethylenically unsaturated compound, a lactone, a dilactone, a thiolactone, a lactam, a thiolactam, a carboxylic acid or derivative thereof, or an epoxide.

The present invention additionally relates generally to the use of a compound according to the present invention as described above and in more detail below as a catalyst for a polyaddition or polycondensation reaction. Thus, also provided according to the present invention is a curable composition comprising:
(A) a first reactive compound comprising reactive functional groups;
(B) a second reactive compound comprising functional groups reactive with the reactive functional groups in (A); and
(C) a catalyst component comprising at least one compound according to the present invention as described above and in more detail below.

Such compositions may typically be used as a curable film-forming composition.

The present invention further provides a method of controlling the rate of cure of a curable composition comprising adding to the curable composition the catalytic composition described above and in more detail below. The curable composition comprises:
(A) a first reactive compound comprising reactive functional groups; and
(B) a second reactive compound comprising functional groups reactive with the reactive functional groups in (A).

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about," even if the term does not expressly appear. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

Plural encompasses singular and vice versa; e. g., the singular forms "a," "an," and "the" include plural referents unless expressly and unequivocally limited to one referent. For example, where the invention has been described in terms of "a" tin (IV) compound or "an" adduct, a plurality, including a mixture of such compounds, can be used.

The present invention provides catalysts that mitigate or overcome the above-mentioned deficiencies of the prior art, in particular to provide catalytically active compounds that enable an effective cure under controllable conditions when used in a curable coating composition while at the same time exhibiting sufficiently long pot life.

The thermolatently catalytic, tin-containing compounds of the present invention were found to exhibit thermolatent catalytic behavior. Pot life and cure speed can thus both be optimized in a thermally cured composition overcoming the conventional pot life/cure speed dilemma. Accordingly, suitably long pot life can be achieved while still having efficient cure when cured at moderate temperatures of e.g. 60-80° C., or at higher temperatures.

The catalytic compounds of the present invention are compounds of formula I:

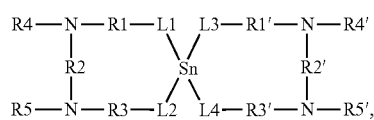

In formula L1, L2, L3, and L4 are each independently selected from —O—, —S—, —OC(=O)—, —OC(=S)—, —SC(=O)—, —SC(=S)—, —OS(=O)$_2$O—, —OS(=O)$_2$— —N(R6)-, and —OP(=O)(R6)-, wherein R6 represents hydrogen or a monovalent aliphatic, araliphatic, cycloaliphatic or aromatic group having up to 20 carbon atoms, which can optionally contain one or more heteroatoms selected from the group consisting of oxygen, sulfur, and nitrogen. L1, L2, L3, and L4 often comprise —O—. R1, R2, R3, R1', R2', and R3' each independently represent a divalent saturated or unsaturated, linear or branched, aliphatic or cycloaliphatic or aromatic or araliphatic group having up to 20 carbon atoms, which can optionally contain one or more heteroatoms selected from the group consisting of oxygen, sulfur, and nitrogen. R1, R2, R3, R1', R2', and R3' often comprise a divalent ethyl (—CH$_2$—CH$_2$—) group. R4, R5, R4', and R5' each independently represent hydrogen or a monovalent residue derived from reaction of a respective N—H group with one or more of the following: an isocyanate, an ethylenically unsaturated compound, a lactone, a dilactone, a thiolactone, a lactam, a thiolactam, a carboxylic acid or derivative thereof, and an epoxide. For example, different N—H groups can be reacted with two or more different isocyanates, or with an isocyanate and a lactone, or with another combination of compounds listed above. R4, R5, R4', and R5' often comprise a monovalent residue derived from reaction of a respective N—H group with an alkyl ester of acrylic acid.

In a particular example, a compound of the present invention may have the structure below:

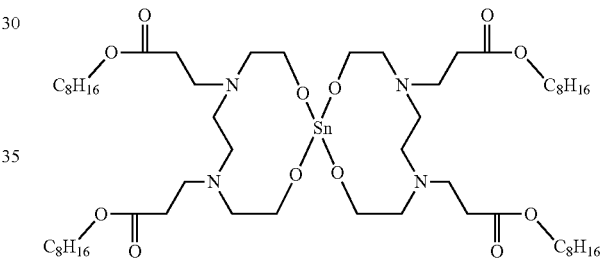

The compound of formula I may comprise a reaction product of:
(i) a tin(IV) compound; and
(ii) a compound having two secondary amine groups and two additional active hydrogen-containing functional groups that may be the same as or different from the amine groups and from each other. An active hydrogen group is defined as a functional group having a reactive hydrogen atom. Examples include —OH, —NH, —COOH, —SH, and the like as known in the art. In this scenario, R4, R5, R4' and R5' may comprise hydrogen. Often, the compound of formula I comprises a reaction product of:
(i) a tin(IV) compound; and
(ii) an adduct of:
  (a) a compound having two secondary amine groups and two additional active hydrogen-containing functional groups that may be the same as or different from the amine groups and from each other; and
  (b) a reactant comprising an isocyanate, an ethylenically unsaturated compound, a lactone, a dilactone, a thiolactone, a lactam, a thiolactam, a carboxylic acid or derivative thereof, and/or an epoxide.

Suitable tin(IV) compounds (i) include inorganic tin(IV) compounds such as tin(IV)halides or tin(IV) alkoxides. For example, tin(IV) chloride, tin(IV) isopropoxide and/or tin (IV) tertbutoxide can be used as tin(IV) compound to prepare a compound of formula I. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

The compound (a) having two secondary amine groups and two additional active hydrogen-containing functional groups, used to prepare the adduct (ii), may include any that would yield —O—, —S—, —OC(=O)—, —OC(=S)—, —SC(=O)—, —SC(=S)—, —OS(=O)$_2$O—, —OS(=O)$_2$— —N(R6)-, or —OP(=O)(R6)- as the linking groups L1, L2, L3, and L4 in Formula I above. For example an N, N'-substituted alkylene diamine derivative can be used as the compound (a) in the preparation of the adduct (ii). The substituents are typically a monovalent group comprising from 1 to 12 carbon atoms and having an active hydrogen-containing functional group such as a hydroxyl group, thiol group, amine group, acid group or the like. The N, N'-substituted alkylene diamine derivative typically derives from an alkylene diamine having from 1 to 12 carbon atoms, usually from 2 to 6 carbon atoms, such as ethylene diamine, propylene diamine or hexamethylenediamine. Often, N, N'-bis(hydroxyethyl) ethylenediamine is used as the compound (a). The reactant (b) may comprise an isocyanate, an ethylenically unsaturated compound, a lactone, a dilactone, a thiolactone, a lactam, a thiolactam, a carboxylic acid or derivative thereof, and/or an epoxide.

Suitable isocyanates include mono- and diisocyanates. Particular exemplary diisocyanates for use as the reactant (b) include phenyl isocyanate, toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. Nonlimiting suitable ethylenically unsaturated compounds that can be used as reactant (b) include alkyl esters of acrylic acid or methacrylic acid, such as aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other ethylenically unsaturated compounds include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Non-limiting examples of lactones that can be used as reactant (b) include beta-, gamma-, delta-, and epsilon-lactones that comprise 3- to 8-member rings, for example ε-caprolactone. Analogous thiolactones including unsaturated compounds such as thiophenone, lactams, and thiolactams are also suitable. Dilactones such as lactide and glycolide may also be used. Useful carboxylic acids and derivatives such as acid chlorides include benzoyl chloride and acetyl chloride. Examples of epoxides that may be used include Cardura E10P Glycidyl Ester available from Momentive Specialty Chemicals, Inc., and cyclohexene oxide. Compounds having two different groups are also suitable, such as isocyanatoethyl (meth)acrylate, allyl isocyanate; vinyl isocyanate, (meth) acrylic acid, and (meth) acryloyl chloride. Often the reactant (b) comprises an alkyl (meth)acrylate, such as in particular 2-ethylhexyl acrylate and/or butyl acrylate, and/or a lactone such as ε-caprolactone.

The tin-containing compounds of formula I described above may be used as a catalyst in curable compositions in accordance with the present invention. The curable compositions of the present invention may be sprayable, castable, extrudable, or moldable. They may be used, for example, as adhesives, sealants, or film-forming compositions. The terms "film-forming" and "coating" with respect to compositions are used interchangeably. Such compositions may be in a solid particulate form such as a powder coating composition, solventborne, or waterborne. The curable compositions typically comprise a combination of reactive components and a catalyst component comprising one or more tin-containing compounds of formula I as described above. The reactive components comprise (A) a first reactive compound comprising reactive functional groups; and (B) a second reactive compound comprising functional groups reactive with the reactive functional groups in (A).

The unique nature of the curable compositions of the present invention may enable them to be provided and stored as one-package compositions prior to use because some or all of the catalyst can be prevented from initiating a reaction until desired since it is thermolatent. The term "thermolatent catalyst" refers to a compound that is of low catalytic activity or is relatively inactive at ambient temperatures, and which becomes more catalytically active, such as by disassociation, decoordination, ring opening, ionization, or tautomerization upon heating to effect catalysis of a chemical reaction. Ambient temperature typically ranges from 60 to 90° F. (15.6 to 32.2° C.), such as a typical room temperature, 72° F. (22° C.). A one-package composition will be understood as referring to a composition wherein all the components are maintained in the same container after manufacture, during storage, etc. A typical one-package composition can be cast or applied to a substrate as desired and cured by any conventional means, such as by heating, forced air, radiation cure and the like. For some compositions, such as compositions for ambient cure coatings, it is not practical to store them as a one-package, but rather they must be stored as multi-package compositions to prevent the components from curing prior to use. The term "multi-package compositions" means compositions in which various components are maintained separately until just prior to application. The present curable compositions according to the present invention can also be multi-package compositions, such as a two-package composition.

Thus, the components (A) and (B) may be provided as a one-package (1K) or multi-package, such as a two-package (2K) system. The reactive components are often provided in separate packages and mixed together immediately prior to the reaction. When the reaction mixture is a multi-package system, the catalyst component may be present in either one or both of the separate components (A) and (B) and/or as an additional separate component package.

Suitable first reactive compounds (A) for use in the curable compositions of the present invention include polyisocyanates, including blocked isocyanates, polyepoxides, polyacids, polyols, organosiloxanes and mixtures of any of the foregoing provided they do not react with each other, and include those known in the art for any of these materials.

As used herein, the term "polyisocyanate" is intended to include blocked (or capped) polyisocyanates as well as unblocked polyisocyanates. The polyisocyanate can be aliphatic, aromatic, or a mixture thereof. Isocyanate functional uretdiones, allophanates, biurets, and isocyanurates are also suitable. Diisocyanates and triisocyanates such as isocyanurates of diisocyanates are often used. Isocyanate prepolymers, for example reaction products of polyisocyanates with polyols also can be used. Mixtures of polyisocyanates can be used.

The polyisocyanate can be prepared from a variety of isocyanate-containing materials. Other examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Polyepoxides are likewise suitable for use as the first reactive compound (A) and are reactive for example with compounds having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described below, are also suitable as crosslinking agents.

Examples of suitable polycarboxylic acids for use as the first reactive compound (A) include adipic, succinic, sebacic, azelaic, and dodecanedioic acid. Other suitable polyacids include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacids are described in further detail in U.S. Pat. No. 4,681,811, at column 6, line 45 to column 9, line 54, which is incorporated herein by reference.

Other suitable polyacids and polyols useful as the first reactive compound (A) include any of those known in the art, such as acid and/or hydroxyl functional acrylic polymers, and those described below for the making of polyesters.

Suitable organosiloxanes that can be used as first reactive compound (A) include organosiloxanes having the formula $R7_n$—Si—$(OR8)_{4-n}$, wherein n=0-3, R7 comprises an aryl, alkyl, or cycloalkyl group containing up to 6 carbon atoms, and R8 comprises an alkyl, hydroxyalkyl, alkoxyalkyl, or hydroxyalkoxyalkyl group containing up to 6 carbon atoms. Polymeric organosiloxanes may also be used.

The amount of the first reactive compound (A) in the curable composition generally ranges from 5 to 90 percent by weight based on the total weight of resin solids in the curable composition, such as at least 10 percent by weight, or at least 15 percent by weight, and up to 70, or up to 50 percent by weight, or up to 25 percent by weight.

The second reactive compound (B) comprises functional groups reactive with the reactive functional groups of component (A). The second reactive compound (B) may for example comprise an acrylic polymer, a polyether polymer, polyurethane, a polyamide and/or a polyester polymer. As used herein, the term "polymer" is meant to refer to prepolymers, oligomers and both homopolymers and copolymers; the prefix "poly" refers to "two or more". The polymer may have reactive functional groups selected from at least one of hydroxyl groups, silanol groups, alkoxysilane, carboxylic acid groups, thiol groups, amine groups, epoxide groups, carbamate groups, amide groups, and urea groups. Mixtures of any of the foregoing may be used provided they do not react with each other, and include those known in the art for any of these materials. The functional groups on the second reactive compound (B) are selected so as to be reactive with those on the first reactive compound (A).

Suitable acrylic polymers that can be used as the second reactive compound (B) include (co)polymers of one or more alkyl esters of acrylic acid or methacrylic acid, optionally copolymerized together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include for example vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic (co)polymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, usually containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

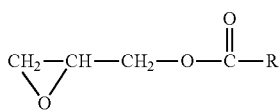

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido groups using techniques known to those skilled in the art. Likewise, other functional groups may be incorporated as desired using suitably functional monomers if available or conversion reactions as necessary.

Acrylic polymers useful as second reactive compound (B) in the curable compositions according to the present invention can be prepared via aqueous emulsion polymerization techniques and used directly in the preparation of aqueous coating compositions, or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the second reactive compound (B) in the curable composition may for example be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4, 4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, urea, silanol, silane or others listed above may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the second reactive compound (B) in the curable composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate polymethylene polyphenyl isocyanate, and isocyanate trimers based on 1,6-hexamethylene diisocyanate or isophorone diisocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, or others listed above may be incorporated into the polyurethane as desired using suitably functional reactants if available, or conversion reactions as necessary to yield the desired functional groups. Such techniques are known to those skilled in the art.

Nonlimiting examples of polyether polyols useful as the second reactive compound (B) in the curable compositions according to the present invention are polyalkylene ether polyols which include those having the following structural formula:

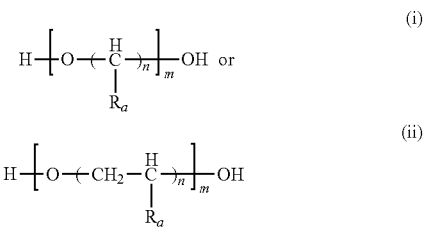

where the substituent $R_a$ comprises hydrogen or lower alkyl containing from 1 to 5 carbon atoms including mixed substituents, and n is typically from 2 to 6 and m is from 8 to 100 or higher. Included are for example poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene and/or ethylene oxide, in the presence of an acidic or basic catalyst. Particular polyethers include those sold under the names TERATHANE and TERACOL, available from Invista, and POLYMEG, available from Lyondell Chemical Co.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups.

The second reactive compound (B) may also comprise a hydroxyalkyl urea and/or a hydroxyalkyl amide.

The amount of the second reactive compound (B) in the curable composition generally ranges from 10 to 95 percent by weight based on the total weight of resin solids in the curable composition, such as at least 10 percent by weight, or at least 15 percent by weight, and up to 75 percent by weight, or up to 50 percent by weight, or up to 35 percent by weight.

In a particular example of the present invention, the curable composition comprises:
(A) a curing agent comprising reactive isocyanate functional groups;
(B) a film-forming compound comprising functional groups reactive with the reactive isocyanate functional groups in (A); and
(C) a catalyst component comprising at least one tin-containing compound according to formula I as described above. This curable composition is particularly suitable as a film-forming composition.

In certain aspects of the present invention the curing agent (A) may comprise a polyisocyanate such as one or more of any of the diisocyanates and triisocyanates or higher polyisocyanates described above. The film-forming compound (B) may comprise any of the compounds described above with respect to the second reactive compound, often a polyol, such as an acrylic polyol, a polyether polyol, a polyurethane polyol, and/or a polyester polyol as described above.

In the curable compositions of the present invention, adding the catalyst to the reaction mixture may cause the curing reaction to proceed at a temperature lower than would be required without the use of the catalyst. Also, the reaction may occur faster at a given temperature than would otherwise be observed between the particular reactants, but particularly at elevated temperature. Furthermore, the activity of the thermolatent catalyst of the present invention is minimized at ambient temperatures, giving more control to the operator as to when the reaction occurs. The catalytic activity of the thermolatent catalyst is enhanced at elevated temperatures, such as greater than 40° C., depending on the chemistries involved. A particular advantage of the catalyst and compositions of the present invention is that in order to inhibit undesired premature curing during storage of perforomulated (1K) compositions, the thermolatent catalyst of the present invention allows for good stability during storage in curable compositions at ambient temperature but also rapid conversion into the active catalyst when the compositions are heated. In the case of multi-component formulations, a long pot life can be achieved with the thermolatent catalyst, that would not be possible with a traditional catalyst such as dibutyltin dilaurate, while maintaining effective cure from increased catalytic activity at elevated temperatures.

The catalyst component is used in an amount sufficient to enable or accelerate reaction of any reactive functional groups on the first reactive compound or curing agent (A) with reactive functional groups on the second reactive compound or film-forming compound (B). The catalyst component may be used in the curable compositions of the present invention in amounts of 5 to 5000, such as at least 20 or at least 50 and up to 4000 or up to 3000, parts per million metal by weight, based on the total weight of resin solids in the curable composition. Such amounts are also suitable when the curable composition is a film-forming composition.

Pot life is herein defined as the span of time during which a coating is ready to apply (for example, because all components have been combined) and still of low enough viscosity to be applied and the desired or expected ultimate properties of the coating are still attained. For other curable compositions, pot life is the span of time during which a curable composition is ready to be molded, cast, or extruded (for example, because all components have been combined) and still of low enough viscosity to be molded, cast, or extruded. Quantitatively, the time it takes for the viscosity of a curable composition to double that of the initial viscosity is reported as pot life.

If desired, the curable composition can comprise other optional materials well known in the art, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids, colorants, abrasion resistant particles and other customary auxiliaries. Such materials are well known in the art of coatings.

As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used in the compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the compositions by grinding or simple mixing. Colorants can be incorporated by grinding into the composition by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triaryl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the composition, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application Ser. No. 60/482,167 filed Jun.

24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. For example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. The photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some compositions in which the photosensitive composition may migrate out of the coating and crystallize into the substrate, the photosensitive composition and/or photochromic composition associated with and/or at least partially bound to a polymer and/or polymerizable component have minimal migration out of the composition. Example photosensitive compositions and/or photochromic compositions and methods for making them are identified in U.S. application Ser. No. 10/892,919 filed Jul. 16, 2004, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Also provided by the present invention is a method of controlling the rate of cure of a curable composition. The method, comprises adding to a curable composition that comprises a first reactive compound or curing agent (A) and a second reactive compound or film-forming compound (B) as described above, a catalyst component comprising at least one tin-containing catalytic compound according to the present invention as described above.

When the curable composition is to be formed into an article of manufacture, after adding the catalyst component to the curable composition, the method may further comprise forming the article by casting the curable composition into a sheet and post-processing the sheet to a desired shape and form, casting the curable composition in a mold, spraying the curable composition into a mold, 3-D printing, or injection-molding the composition. When the curable composition comprises a film-forming composition, after adding the catalyst component to the curable film-forming composition the method may further comprise applying the curable film-forming composition to a substrate to form a coated substrate; and exposing the coated substrate to conditions for a time sufficient to at least partially cure the curable film-forming composition. When the curable composition is used as a sealant or adhesive, after adding the catalyst component to the curable composition the method may further comprise applying the curable composition to a substrate such as by extruding the composition as a bead; and when appropriate, such as after adjoining to a separate substrate as in the case of an adhesive, exposing the composition on the substrate to conditions for a time sufficient to at least partially cure the curable composition.

Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate may alternatively comprise a polymer or a composite material such as a carbon fiber and/or fiberglass composite. Car parts typically formed from thermoplastic and thermoset materials include bumpers and trim.

Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below. Examples of aluminum alloys include those alloys used in the automotive or aerospace industry, such as 2000, 6000, or 7000 series aluminums; 2024, 7075, 6061 are particular examples. Alloys may be unclad or they may contain a clad layer on one or more surfaces, the clad layer consisting of a different aluminum alloy than the base/bulk alloy beneath the clad layer.

The substrate may alternatively comprise more than one metal or metal alloy in that the substrate may be a combination of two or more metal substrates assembled together such as hot-dipped galvanized steel assembled with aluminum substrates. The substrate may comprise part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the metal substrate can be in the form of a sheet, plate, bar, rod or any shape desired, but it is usually in the form of an automobile part, such as a body, door, fender, hood or bumper. The thickness of the substrate can vary as desired.

The curable film-forming composition may be applied directly to the metal substrate when there is no intermediate coating between the substrate and the curable film-forming composition. By this is meant that the substrate may be bare, as described below, or may be treated with one or more pretreatment compositions as described below, but the substrate is not coated with any coating compositions such as an electrodepositable composition or a primer composition prior to application of the curable film-forming composition of the present invention.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

The substrate may optionally be cleaned using conventional cleaning procedures and materials. These would include mild or strong alkaline cleaners such as are commercially available and conventionally used in metal pretreatment processes. Examples of alkaline cleaners include Chemkleen 163 and Chemkleen 177, both of which are available from PPG Industries, Pretreatment and Specialty Products. Such cleaners are generally followed and/or preceded by a water rinse. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes.

According to the present invention, at least a portion of a cleaned aluminum substrate surface may be deoxidized, mechanically or chemically. As used herein, the term "deoxidize" means removal of the oxide layer found on the surface of the substrate in order to promote uniform deposition of the pretreatment composition (described below), as well as to promote the adhesion of the pretreatment composition coating to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers (available from Henkel Technologies, Madison Heights, Mich.), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating.

A metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the *Handbook of Chemistry and Physics,* 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

In the aerospace industry, anodized surface treatments as well as chromium based conversion coatings/pretreatments are often used on aluminum alloy substrates. Examples of anodized surface treatments would be chromic acid anodizing, phosphoric acid anodizing, boric acid-sulfuric acid anodizing, tartaric acid anodizing, sulfuric acid anodizing. Chromium based conversion coatings would include hexavalent chromium types, such as Bonderite® M-CR1200 from Henkel, and trivalent chromium types, such as Bonderite® M-CR T5900 from Henkel.

The curable film-forming composition of the present invention may be applied to the substrate using conventional techniques including dipping or immersion, spraying, intermittent spraying, dipping followed by spraying, spraying followed by dipping, brushing, or roll-coating.

The coating compositions of the present invention may be used alone as a protective layer or may serve as a direct gloss, unicoat, or monocoat, layer. Alternatively, the compositions of the present invention may be in combination as primers, basecoats, and/or topcoats. Thus the present invention provides a coated substrate comprising a substrate and a film-forming composition applied to a surface of the substrate, forming a coating; wherein the film-forming composition comprises any of the curable film-forming compositions described above. The present invention also provides a multi-component composite coating comprising a first film-forming composition applied to a substrate to form a colored base coat, and a second, transparent film-forming composition applied on top of the base coat to form a clear top coat, wherein the transparent film-forming composition comprises the curable film-forming composition of the present invention as described above. The term "transparent", as used for example in connection with a substrate, film, material and/or coating, means that the indicated substrate, coating, film and/or material is optically clear and has the property of transmitting light without appreciable scattering so that objects lying beyond are entirely visible.

Suitable base coats include any of those known in the art, and may be waterborne, solventborne or powdered. The base coat typically includes a film-forming resin, crosslinking material and pigment. Non-limiting examples of suitable base coat compositions include waterborne base coats such as are disclosed in U.S. Pat. Nos. 4,403,003; 4,147,679; and 5,071,904.

After application of each composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 70 to 250° F. (27 to 121° C.) will be sufficient. More than one coating layer of the present composition may be applied if desired. Usually between coats, the previously applied coat is flashed; that is, exposed to ambient conditions for the desired amount of time.

The thickness of the coating is usually from 0.1 to 6 mils (2.5 to 150 microns), such as 0.2 to 2.0 mils (5.0 to 50 microns). The coating composition may then be heated. In the curing operation, solvents are driven off and crosslinkable components of the composition are crosslinked. The heating and curing operation is sometimes carried out at a temperature in the range of from 70 to 465° F. (27 to 241° C.) but, if needed, lower or higher temperatures may be used. As noted previously, the coatings of the present invention may also cure without the addition of heat or a drying step. However, the catalyst of the present invention is thermally activated at temperatures of at least 40° C., at which point catalyst activity is noticeably increased. Additionally, the first coating composition may be applied and then the second applied thereto "wet-on-wet", or at least one base coat may be applied on top of a primer before the primer is cured, followed by application of a clear coat to the base coat(s) before the base coat(s) is cured; i. e., "wet-on-wet-on-wet" or "3-wet", and the entire multi-layer coating stack cured simultaneously in a compact process (also known as 3C1B). Alternatively, each coating composition can be cured before application of the next coating composition.

Each of the characteristics and examples described above, and combinations thereof, may be said to be encompassed by the present invention. The present invention is thus drawn to the following nonlimiting aspects:

1. A compound of formula I:

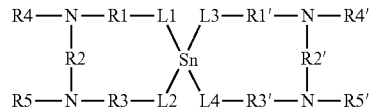

wherein
L1, L2, L3, and L4 are each independently selected from —O—, —S—, —OC(=O)—, —OC(=S)—, —SC(=O)—, —SC(=S)—, —OS(=O)$_2$O—, —OS(=O)$_2$——N(R6)-, and —OP(=O)(R6)-, wherein R6 represents hydrogen or a monovalent aliphatic, araliphatic, cycloaliphatic or aromatic group having up to 20 carbon atoms, which can optionally contain one or more heteroatom selected from the group consisting of oxygen, sulfur and nitrogen;
R1, R2, R3, R1', R2', and R3' each independently represent a divalent aliphatic, araliphatic, cycloaliphatic or aromatic group having up to 20 carbon atoms, which can optionally contain one or more heteroatom selected from the group consisting of oxygen, sulfur and nitrogen; and
R4, R5, R4', and R5' each independently represent hydrogen or a monovalent residue derived from reaction of a respective N—H group with an isocyanate, an ethylenically unsaturated compound, a lactone, a dilactone, a thiolactone, a lactam, a thiolactam, a carboxylic acid or derivative thereof, or an epoxide.

2. The compound of formula I according to aspect 1 comprising a reaction product of:
  (i) a tin(IV) compound; and
  (ii) an adduct of:
    (a) a compound having two secondary amine groups and two additional active hydrogen-containing functional groups that may be the same as or different from the amine groups and from each other; and
    (b) a reactant comprising an isocyanate, an ethylenically unsaturated compound, a lactone, a dilactone, a thiolactone, a lactam, a thiolactam, a carboxylic acid or derivative thereof, and/or an epoxide.

3. The compound of formula I according to aspect 2, wherein the tin(IV) compound (i) comprises an inorganic tin(IV) compound such as a tin(IV)halide and/or tin(IV) alkoxide, often comprising tin(IV) chloride, tin(IV) isopropoxide and/or tin(IV) tertbutoxide.

4. The compound of formula I according to aspect 2 or 3, wherein the compound (a) having two secondary amine groups and two additional active hydrogen containing functional groups comprises an N, N'-substituted alkylene diamine derivative, usually N, N'-bis(hydroxyethyl) ethylenediamine.

5. The compound of formula I according to any of aspects 2 to 4, wherein the reactant (b) comprises an alkyl (meth) acrylate such as 2-ethylhexyl acrylate and/or butyl acrylate and/or a lactone such as ε-caprolactone.

6. A curable composition comprising:
   (A) a first reactive compound comprising reactive functional groups;
   (B) a second reactive compound comprising functional groups reactive with the reactive functional groups in (A); and
   (C) a catalyst component comprising at least one compound according to any one of aspects 1 to 5.

7. The curable composition according to aspect 6, wherein the first reactive compound (A) comprises a polyisocyanate, polyepoxide, polyol, and/or polyacid.

8. The curable composition according to aspect 6 or 7, wherein the second reactive compound (B) contains hydroxyl, acid, and/or thiol reactive functional groups.

9. The curable composition of aspect 6 being a film-forming composition, wherein the first reactive compound (A) comprises a curing agent comprising reactive isocyanate functional groups, and the second reactive compound (B) comprises a film-forming compound comprising functional groups reactive with the reactive isocyanate functional groups in (A).

10. The curable film-forming composition of aspect 9, wherein the curing agent comprises a diisocyanate and/or a triisocyanate.

11. The curable composition according to any of aspects 6 to 10, wherein the second reactive compound (B) or the film-forming compound comprises an acrylic polymer, a polyether polymer, polyurethane and/or a polyester polymer.

12. A method of controlling the rate of cure of a curable composition comprising
   (A) a first reactive compound comprising reactive functional groups; and
   (B) a second reactive compound comprising functional groups reactive with the reactive functional groups in (A), the method comprising adding to the curable composition a catalyst component comprising at least one compound according to any one of preceding aspects 1 to 5.

13. The method according to aspect 12, wherein component (A) and/or component (B) of the curable coating composition is as defined in any one of preceding aspects 7 to 11.

14. The method according to aspect 12 or 13, wherein after adding the catalyst component to the curable composition the method further comprises applying the curable composition to a substrate as a coating to form a coated substrate; and exposing the coated substrate to conditions for a time sufficient to at least partially cure the curable composition.

15. A coated substrate having an at least partially cured coating layer formed from a curable composition of any one of preceding aspects 6 to 11, such as by the method of aspect 14.

16. Use of a compound according to any one of aspects 1 to 5 as catalyst for a polyaddition or polycondensation reaction, such as in a curable composition as defined in any one of preceding aspects 6 to 11.

The present invention will further be described by reference to the following examples. The examples are merely illustrative of the invention and are not intended to be limiting. Unless otherwise indicated, all parts are by weight.

EXAMPLES

The following examples are presented to demonstrate the general principles of the invention.

ICP analysis for the determination of tin content in the reaction products of Examples 1.2, 2.2, and 3.2 was performed as follows:

Reagents:
   1. Nitric Acid ($HNO_3$)—Concentrated, Trace Metal Grade
   2. Hydrochloric Acid (HCl)—Concentrated, Trace Metal Grade
   3. Ultrapure water, >17.5 megohm purity Method Summary:

Weigh 0.1 g of a sample in duplicate into a high pressure TFM microwave vessel (Milestone Ethos Plus Microwave Digestion System). Add 10 mL $HNO_3$ (concentrated—trace metal grade) and 5 mL HCl (concentrated—trace metal grade). In addition, prepare a reagent blank vessel without sample. Seal vessels and microwave according to manufacturer's instructions, using the following parameters:

| Action | Duration | Sample Temperature |
|---|---|---|
| Ramp | 45 minutes | 140° C. |
| Hold | 10 minutes | 140° C. |
| Ramp | 15 minutes | 165° C. |
| Hold | 10 minutes | 165° C. |
| Ramp | 15 minutes | 180° C. |
| Hold | 15 minutes | 180° C. |
| Ramp | 10 minutes | 220° C. |
| Hold | 10 minutes | 220° C. |
| Ramp | 10 minutes | 230° C. |
| Hold | 10 minutes | 220° C. |

Allow to cool to ambient temperature, then transfer to 50 mL volumetric ware with an additional 5 mL HCl (concentrated—trace metal grade) and ultrapure water. Dilute to 50 mL with ultrapure water, cap and mix.

Determination of Sn

Analyze the solutions by Inductively Coupled Plasma-Optical Emission Spectroscopy (ICP-OES) (Perkin Elmer OPTIMA 7300DV Inductively Coupled Plasma-Optical Emission Spectrometer), using the following standard additions, wavelengths and acid matrix matched NIST-traceable calibration standards.

Recommended Sn 100 ppm Standard Addition Solution

Pipet 10 mL of one of the duplicates of each sample into a 50 mL centrifuge tube. Pipet 0.1 mL of the 10,000 ppm Sn standard into the aliquot. Cap the tube and shake thoroughly. Yields standard addition of 100 ppm Sn.

Sn Wavelengths

| Element | Wavelength (nm) |
|---|---|
| Sn | 189.927 |
| Sn | 283.998 |

Sn Calibration Standards—Matrix 10% HCl

|    | 0 ppm | Mid Std   | High Std  | Check Std |
|----|-------|-----------|-----------|-----------|
| Sn | 0     | 20.00 ppm | 200.0 ppm | 100.0 ppm |

Calculation:
Calculations are done using the ICP-OES software provided with the spectrometer.

Dust-free time is the amount of time required for a coating to achieve a level of dryness, such that upon the application and removal of a cotton ball, no cotton fibers are transferred to the coating surface. The cotton ball is applied in the following manner:

1. With a panel in a horizontal position, hold a cotton ball approximately 3 inches above and drop.
2. Hold panel paint side up for 5±2 seconds with cotton ball. After 5 seconds, flip panel paint side down.
   a. If cotton ball drops off leaving no fibers on the film, the coating is dust-free.
   b. If the cotton ball does not drop off or leaves fibers, repeat steps 1-2 at appropriate time intervals until coating is dust-free, such as every 15 minutes.

Example 1.1 Synthesis of Bidentate Ligand

An Salen type ligand was prepared by adding 30 grams of N, N'-bis(2-hydroxylethyl) ethylenediamine (commercially available from Sigma Aldrich) into a 500-mL, 4-necked round bottom flask equipped with a stirrer, a condenser, a nitrogen inlet, and a thermocouple in a heating mantle. Agitation and a nitrogen flow of 0.2 standard cubic feet (scft)/minute were started. 23.11 grams of ε-caprolactone (commercially available from Perstorp Polyols) was added dropwise into the reaction mixture to keep the temperature below 20° C. and followed by 10 grams of isopropanol (Commercially available from Dow Chemical Co.). After addition, the reaction mixture was heated to 70° C. and held for 4 hours. The reaction progress was monitored by Fourier Transform Infrared detection until ε-caprolactone's double peaks 850 and 860/cm disappeared (IR spectrometer, ThermoScientific Nicolet iS5 FT-IR). Then 37.30 grams of 2-ethylhexyl acrylate (commercially available from Solvay) was added into the reaction mixture, the reaction mixture held at 75° C. for 3 hours and then allowed to cool to ambient temperature. An orange solution was obtained. This product mixture was used for making a tin-containing catalyst as set forth below without further purification.

Example 1.2 Synthesis of Tin-Containing Catalyst

A tin-containing catalyst was prepared by adding 17.81 grams of tin tetrachloride (commercially available from Sigma Aldrich) and 142.5 grams of heptane (commercially available from Citgo Petroleum Corp.) into a 1000-mL, 4-necked round bottom flask equipped with a stirrer, a condenser, a nitrogen inlet, and a thermocouple in a heating mantle. Agitation and a nitrogen flow of 0.2 standard cubic feet (scft)/minute were started. A mixture of 22.60 grams of diethylamine (commercially available from Sigma Aldrich) and 27.12 g of heptane was added dropwise into the reaction mixture to keep the temperature below 40° C. After addition, the reaction mixture was maintained with agitation at room temperature for 30 minutes. 85.04 grams of the bidentate ligand from Example 1.1 was added dropwise into the reaction mixture over 30 minutes. Then the reaction mixture was heated to 60° C. and held at 60° C. for 2 hours. This reaction mixture was then cooled to 35° C. The heterogeneous mixture was filtered through a filter paper and washed with acetone until the solid became white. The organic solution was combined together and transferred to a flask. The solvent was distilled off and an orange oil was obtained. This product was used without further purification as tin-containing catalyst in the formulation of curable compositions as set forth below. The tin content of the obtained product was 3.6 wt. % as determined by ICP analysis.

Example 2.1 Synthesis of Bidentate Ligand

An Salen type ligand was prepared by adding 20.5 grams of N, N'-bis(2-hydroxylethyl) ethylenediamine into a 500-mL, 4-necked round bottom flask equipped with a stirrer, a condenser, a nitrogen inlet, and a thermocouple in a heating mantle. Agitation and a nitrogen flow of 0.2 standard cubic feet (scft)/minute were started. 50.86 grams of 2-ethylhexyl acrylate was added into the reaction mixture. Then the reaction mixture was gradually heated to 120° C., held at 120° C. for 5 hours and afterwards allowed to cool to room temperature. A clear orange solution was obtained. This product was used for making a tin-containing catalyst as set forth below without further purification.

Example 2.2 Synthesis of Tin-Containing Catalyst

A tin-containing catalyst was prepared by adding 20.03 grams of tin tetrachloride and 160.3 grams of heptane into a 1000-mL, 4-necked round bottom flask equipped with a stirrer, a condenser, a nitrogen inlet, and a thermocouple in a heating mantle. Agitation and a nitrogen flow of 0.2 standard cubic feet (scft)/minute were started. A mixture of 25.42 grams of diethylamine and 30.51 grams of heptane was added dropwise into the reaction mixture to keep the temperature below 40° C. After addition, the reaction mixture was maintained with agitation at room temperature for 30 minutes. 79.48 grams of the bidentate ligand from Example 2.1 was added dropwise into reaction mixture over 30 minutes. Then the reaction mixture was heated to 60° C. A mixture of 75 grams of heptane and 100 grams of methyl ethyl ketone was added into the reaction mixture. Then the reaction mixture was held at 60° C. for 5 hours. The heterogeneous mixture was immediately filtered through a filter paper and the white precipitate was washed with methyl ethyl ketone until the solid became white. The organic solution was combined together and transferred to a flask. The solvent was distilled off and an orange oil was obtained. This product was used without further purification as tin-containing catalyst in the formulation of curable compositions as set forth below. The tin content of the obtained product was 8.62 wt. % as determined by ICP analysis.

Example 3.1 Synthesis of Bidentate Ligand
(Comparative Example)

A bidentate ligand was prepared by adding 60.00 grams of diethanolamine into a 500-mL, 4-necked round bottom flask equipped with a stirrer, a condenser, a nitrogen inlet, and a thermocouple in a heating mantle. Agitation and a nitrogen flow of 0.2 standard cubic feet (scft)/minute were started. 105.16 grams of 2-ethylhexyl acrylate was added into reaction mixture. Then the reaction mixture was gradually heated to 120° C. and held at 120° C. for 5 hours. A clear orange solution was obtained. This product was used for making a tin-containing catalyst as set forth below without further purification.

Example 3.2 Synthesis of Tin-Containing Catalyst (Comparative Example)

A tin-containing catalyst was prepared by adding 20.03 grams of tin tetrachloride and 160.3 grams of heptane into a 1000-mL, 4-necked round bottom flask equipped with a stirrer, a condenser, a nitrogen inlet, and a thermocouple in a heating mantle. Agitation and a nitrogen flow of 0.2 standard cubic feet (scft)/minute were started. A mixture of 25.42 grams of diethylamine and 30.51 grams of heptane was added dropwise into the reaction mixture to keep the temperature below 40° C. After addition, the reaction mixture was maintained with agitation at room temperature for 30 minutes. 44.51 grams of the bidentate ligand from Example 3.1 was added dropwise into reaction mixture over 30 minutes. 80 grams of methyl ethyl ketone was added into the reaction mixture. Then the reaction mixture was heated to 60° C. and was held at 60° C. for 3 hours. The heterogeneous mixture was filtered through a filter paper and the white precipitate was washed with methyl ethyl ketone until the solid became white. The organic solution was combined together and transferred to a flask. The solvent was distilled off and an orange oil was obtained. This product was used without further purification as tin-containing catalyst in the formulation of curable compositions as set forth below. The tin content of the product was 15.90 wt. % as determined by ICP analysis. This example was prepared in accordance with U.S. Pat. No. 8,946,372.

Formulation Examples

Preparation of Curable Compositions Including a Tin-Containing Catalyst

Two component coating formulas were prepared by first preparing each component (A-Pack, B-Pack). The formulas were prepared as outlined in Table 1:

TABLE 1

Coating formulations.

| | Mass (g) | | | | | |
| --- | --- | --- | --- | --- | --- | --- |
| Ingredient | Comparative Example 1 | Comparative Example 2 | Comparative Example 3 | Comparative Example 4 | Example 5 | Example 6 |
| A-Pack | | | | | | |
| Acetone | 12.04 | 12.04 | 12.04 | 12.04 | 12.04 | 12.04 |
| Xylene | 33.64 | 33.64 | 33.64 | 33.64 | 33.64 | 33.64 |

TABLE 1-continued

Coating formulations.

| | Mass (g) | | | | | |
| --- | --- | --- | --- | --- | --- | --- |
| Ingredient | Comparative Example 1 | Comparative Example 2 | Comparative Example 3 | Comparative Example 4 | Example 5 | Example 6 |
| Propylene glycol monomethyl ether acetate | 16.94 | 16.94 | 16.94 | 16.94 | 16.94 | 16.94 |
| BYK 300[1] | 0.39 | 0.39 | 0.39 | 0.39 | 0.39 | 0.39 |
| SETALUX 1909 BA-75[2] | 83.97 | 83.97 | 83.97 | 83.63 | 83.97 | 83.63 |
| B-Pack | | | | | | |
| Desmodur N 3390A[3] | 40.88 | 40.91 | — | 40.88 | 40.91 | 40.75 |
| Blulogiq 3190[4] | — | — | 40.91 | — | — | — |
| Dibutyltin dilaurate | 0.15 | — | — | — | — | — |
| Catalyst of Example 2.2 | — | — | — | — | 0.32 | — |
| Catalyst of Example 1.2 | — | — | — | — | — | 0.77 |
| Catalyst of Example 3.2 | — | — | — | 0.18 | — | — |
| Methyl amyl ketone | 10.23 | 10.23 | 10.23 | 10.23 | 10.23 | 10.23 |
| Xylene | 6.01 | 6.01 | 6.01 | 6.01 | 6.01 | 6.01 |

[1]Silicone surface additive from BYK USA, Inc.
[2]Acrylic polyol, 165 mg KOH/g hydroxyl value from Nuplex Resins
[3]Aliphatic polyisocyanate based on hexamethylene diisocyanate (HDI) and dissolved in n-butyl acetate and aromatic 100 (1:1) from Covestro AG
[4]Aliphatic polyisocyanate (HDI trimer) from Covestro AG, thermolatent hardener The B-Packs contain similar preparations with variations in the catalyst component using either free dibutyltin dilaurate (DBTDL), no catalyst, commercially available thermolatent hardener, a previously disclosed catalyst or catalysts according to the present invention as outlined in Table 1. It is important to note that the catalyst levels are selected such that an equal level of Sn is used in each formula to facilitate a direct comparison of the catalyst behavior. The A- and B-packs were combined and mixed just prior to use.

The formulas from the above examples were spray applied to electrocoated steel panels. The panels used were ACT cold rolled steel panels 4 inch by 12 inch (10.16 cm by 30.48 cm) with ED6060 electrocoat available from ACT Laboratories, Inc. The coating compositions were each applied by hand spray using a DeVilbiss GTi HVLP spray gun with a 1.4 mm nozzle at ambient temperature in two coats with an ambient flash between coats. Clearcoats were targeted for a 2 to 2.5 mils (about 51 to 64 micrometers) dry film thickness. After coating application, coating drying and curing properties were monitored under three conditions: ambient, 10 min at ambient followed by 20 min at 60° C., or 10 min at ambient followed by 20 min at 80° C.

Properties of the prepared curable compositions are summarized below in Table 2:

TABLE 2

| Properties | | Comparative Example 1 | Comparative Example 2 | Comparative Example 3 | Comparative Example 4 | Example 5 | Example 6 |
| --- | --- | --- | --- | --- | --- | --- | --- |
| Viscosity[1] at time indicated (cP) | Initial | 23.1 | 25.6 | 26.5 | 23.3 | 24 | 22.3 |
| | 15 min | 34.8 | 28.1 | 30 | 26.5 | 28.1 | 25.2 |
| | 30 min | 55 | 30 | 31.5 | 27.7 | 29.2 | 26.7 |
| | 45 min | 92.1 | 30.8 | 32.7 | 29.0 | 31 | 29 |
| | 60 min | 165.4 | 29.6 | 34.2 | 31.5 | 32.5 | 29.4 |
| | 90 min | gel | 34 | 36.7 | 32.1 | 35.2 | 31.7 |

TABLE 2-continued

| | Properties | Comparative Example 1 | Comparative Example 2 | Comparative Example 3 | Comparative Example 4 | Example 5 | Example 6 |
|---|---|---|---|---|---|---|---|
| | 120 min | — | 36.5 | 39.4 | 35.2 | 39 | 35.4 |
| | 180 min | — | 40.6 | 44.4 | 40.0 | 45.2 | 39.6 |
| | 240 min | — | 46 | 51.5 | 47.3 | 51.5 | 46.2 |
| | 300 min | — | 51 | 59.4 | 53.9 | 61.2 | 53.5 |
| Ambient cure | Dust-free time[2] (min) | 45-60 min | >4 hr | 3.75 hr | >4 hr | 4 hr | 5-6 hr |
| | 1 day Konig[3] (sec) | 14 | 6 | 10 | 7 | 10 | 7 |
| | 11 day Konig[3] (sec) | 64 | 135 | 127 | 83 | 129 | 116 |
| 20 min @ 60° C. cure | Dust-free time[4] (min) | 0 | 2.75 hr | 15 min | 0 | 0 | 0 |
| | 1 day Konig[3] (sec) | 19 | 7 | 18 | 15 | 21 | 18 |
| | 11 day Konig[3] (sec) | 80 | 141 | 124 | 79 | 130 | 113 |
| 20 min @ 80° C. cure | Dust-free time[4] (min) | 0 | 15 min | 0 | 0 | 0 | 0 |
| | 1 day Konig[3] (sec) | 40 | 12 | 66 | 37 | 79 | 57 |
| | 11 day Konig[3] (sec) | 112 | 147 | 135 | 88 | 145 | 130 |

[1]Measured on Brookfield CAP 2000 viscometer with #1 spindle at 900 RPM with a stage temperature of 25° C. Initial measurement recorded immediately after all components of the curable composition were mixed together.
[2]The time at which no cotton fibers adhere to the coating surface as applied after placing a cotton ball on the surface. Measured at 15 min intervals.
[3]Konig pendulum hardness measured with a BYK pendulum hardness tester at indicated time after coating application, 10 days instead of 11 days for Comparative Example 4. For example test procedure see ASTM D4366-14 (2014).
[4]Dust-free time measured with start time (t = 0) directly after removal from oven.

The traditionally catalyzed coating composition of Comparative Example 1 doubles in viscosity in 30 minutes while the formulas of Examples 5 and 6 take 240 minutes, demonstrating a longer usable time of the compositions according to the present invention as compared to the traditionally catalyzed coating composition of Comparative Example 1. The pot life of Examples 5 and 6 are similar to that of the uncatalyzed Comparative Example 2, the composition with the commercially available thermolatent hardener according to Comparative Example 3, and the composition with a catalyst prepared in accordance with U.S. Pat. No. 8,946,372 as used according to Comparative Example 4. When looking at the dust-free time at ambient temperature, Examples 5 and 6 and Comparative Examples 3 and 4 all behave similarly to the uncatalyzed Comparative Example 2, with very long dust-free time. However, the dust-free time of Examples 5 and 6 and Comparative Example 4 when baked at 60° C. is similar to the traditionally catalyzed coating of Comparative Example 1, being dust-free immediately after the bake while Comparative Examples 2 and 3 require an additional 2.75 hours and 15 minutes, respectively, until a dust-free state is achieved. Furthermore, the 1 day Konig pendulum hardness of Example 5 is the highest hardness observed, while the hardness obtained in case of Example 6 is similar to Comparative Examples 1 and 3. Additionally, the 11 day hardness of Example 5 is the highest of the catalyzed compositions. The curable formulations of Examples 5 and 6 and Comparative Examples 3 and 4 all show some degree of thermally induced catalytic activity, with Example 5 having the highest observed hardness of the thermally induced catalytic formulas.

With an 80° C. bake, Comparative Examples 1, 3, and 4 and Example 5 and 6 all are dust-free after bake. The 1 and 11 day Konig hardness is notably highest for Example 5 compared to all of the catalyzed comparative formulas.

The long pot life, being dust-free after bake at 60 or 80° C., and relatively high Konig pendulum hardness after bake are all indicative of the thermolatent behavior and activity of the catalysts according to the present invention as prepared according to Example 2.2 and 1.2 such that at ambient conditions catalytic activity is minimal but with increased temperature catalytic activity is increased, facilitating cure. Furthermore, when compared to the formulas of Comparative Examples 3 and 4 that contain a thermolatent hardener or catalyst according to existing available technology, the formula of Example 5 shows an advantage in hardness of the film at short and long cure times while the formula of Example 6 is similar to Comparative Example 3 and shows an advantage over Comparative Example 4.

As demonstrated by the data above, in the case of the present invention, pot life and cure speed can both be optimized in a thermally cured composition such that the typical pot life/cure speed paradigm is not applicable. This allows for long pot life to be achieved while still having efficient cure when cured at 60-80° C., or at higher temperatures. Also note, that the cure temperatures required to effectively activate the catalyst to cure the coating are relatively low, in the range of 60–80° C., which allows for many uses of a coating composition in accordance with the present invention with a variety of substrates.

Whereas particular aspects of this invention have been described above for purposes of illustration, it will be evident to those skilled in the art that numerous variations of the details of the present invention may be made without departing from the invention as defined in the appended claims. It is understood, therefore, that this invention is not limited to the particular aspects disclosed, but it is intended to cover modifications that are within the spirit and scope of the invention, as defined by the appended claims.

What is claimed is:

1. A compound of formula I:

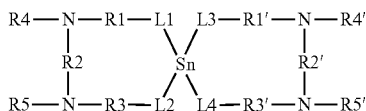

wherein

L1, L2, L3, and L4 are each independently selected from —O—, —S—, —OC(=O)—, —OC(=S)—, —SC(=O)—, —SC(=S)—, —OS(=O)$_2$O—, —OS(=O)$_2$— —N(R6)-, and —OP(=O)(R6)-, wherein R6 represents hydrogen or a monovalent aliphatic, araliphatic, cycloaliphatic or aromatic group having up to 20 carbon atoms, which can optionally contain one or more heteroatom selected from the group consisting of oxygen, sulfur and nitrogen;

R1, R2, R3, R1', R2', and R3' each independently represent a divalent aliphatic, araliphatic, cycloaliphatic or aromatic group having up to 20 carbon atoms, which can optionally contain one or more heteroatom selected from the group consisting of oxygen, sulfur and nitrogen; and R4, R5, R4', and R5' each independently represent hydrogen or a monovalent residue derived from reaction of a respective N—H group with an isocyanate, an ethylenically unsaturated compound, a lactone, a dilactone, a thiolactone, a lactam, a thiolactam, a carboxylic acid or derivative thereof, or an epoxide.

2. The compound of claim 1 comprising a reaction product of:

(i) a tin(IV) compound; and (ii) an adduct of:

(a) a compound having two secondary amine groups and two additional active hydrogen-containing functional groups that may be the same as or different from the amine groups and from each other; and (b) a reactant comprising at least one of an isocyanate, an ethylenically unsaturated compound, a lactone, a dilactone, a thiolactone, a lactam, a thiolactam, a carboxylic acid or derivative thereof, and an epoxide.

3. The compound of claim 2, wherein the tin(IV) compound (i) comprises at least one of tin(IV) chloride, tin(IV) isopropoxide and tin(IV) tertbutoxide.

4. The compound of claim 2, wherein the compound (a) having two secondary amine groups and two additional active hydrogen-containing functional groups comprises N,N'-bis(hydroxyethyl) ethylenediamine.

5. The compound of claim 2, wherein the reactant (b) comprises at least one of 2-ethylhexyl acrylate and butyl acrylate.

6. A curable composition comprising:

(A) a first reactive compound comprising at least one of a polyisocyanate, polyepoxide, polyol, and polyacid;

(B) a second reactive compound comprising at least one of hydroxyl, acid, and thiol reactive functional groups; and (C) a catalyst component comprising at least one compound of claim 1.

7. The curable composition of claim 6, wherein the second reactive compound (B) comprises at least one of an acrylic polymer, a polyether polymer, polyurethane and a polyester polymer.

8. The curable composition of claim 6, wherein the first reactive compound (A) comprises a curing agent comprising reactive isocyanate functional groups, and the second reactive compound (B) comprises a film-forming compound comprising functional groups reactive with the reactive isocyanate functional groups in (A), and wherein the curable composition is a film-forming composition.

9. The curable composition of claim 8, wherein the curing agent comprises at least one of a diisocyanate and a triisocyanate.

10. The curable composition of claim 8, wherein the film-forming compound comprises at least one of an acrylic polyol, a polyether polyol, a polyurethane polyol, and a polyester polyol.

11. A method of controlling the rate of cure of a curable composition comprising adding to the curable composition a catalyst component comprising at least one compound of formula I:

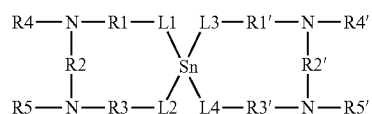

wherein

L1, L2, L3, and L4 are each independently selected from —O—, —S—, —OC(=O)—, —OC(=S)—, —SC(=O)—, —SC(=S)—, —OS(=O)$_2$O—, —OS(=O)$_2$— —N(R6)-, and —OP(=O)(R6)-, wherein R6 represents hydrogen or a monovalent aliphatic, araliphatic, cycloaliphatic or aromatic group having up to 20 carbon atoms, which can optionally contain one or more heteroatom selected from the group consisting of oxygen, sulfur and nitrogen;

R1, R2, R3, R1', R2', and R3' each independently represent a divalent aliphatic, araliphatic, cycloaliphatic or aromatic group having up to 20 carbon atoms, which can optionally contain one or more heteroatoms selected from the group consisting of oxygen, sulfur, and nitrogen; and R4, R5, R4', and R5' each independently represent hydrogen or a monovalent residue derived from reaction of a respective N—H group with an isocyanate, an ethylenically unsaturated compound, a lactone, a dilactone, a thiolactone, a lactam, a thiolactam, a carboxylic acid or derivative thereof, or an epoxide; and wherein the curable composition comprises:

(A) a first reactive compound comprising at least one of a polyisocyanate, polyepoxide, polyol, and polyacid;

(B) a second reactive compound comprising at least one of hydroxyl, acid, and thiol reactive functional groups.

12. The method of claim 11, wherein after adding the catalyst component to the curable composition the method further comprises applying the curable composition to a substrate as a coating to form a coated substrate; and exposing the coated substrate to conditions for a time sufficient to at least partially cure the curable composition.

13. The method of claim 11, wherein the curable composition is a film-forming composition, the first reactive compound (A) comprises a curing agent comprising reactive isocyanate functional groups, and the second reactive compound (B) comprises a film-forming compound comprising functional groups reactive with the reactive isocyanate functional groups in (A).

14. The method of claim 13, wherein the curing agent comprises at least one of a diisocyanate and a triisocyanate.

15. The method of claim 13, wherein the film-forming compound comprises at least one of an acrylic polyol, a polyether polyol, a polyurethane polyol, and a polyester polyol.

16. A coated substrate comprising an at least partially cured coating layer formed from the curable composition of claim 6.

\* \* \* \* \*